(12) United States Patent
Lin et al.

(10) Patent No.: US 9,783,642 B1
(45) Date of Patent: Oct. 10, 2017

(54) DIFUNCTIONAL POLYHEDRAL OLIGOMERIC SILSESQUIOXANE DERIVATIVE AND SYNTHESIS THEREOF

(71) Applicant: NATIONAL SUN YAT-SEN UNIVERSITY, Kaohsiung (TW)

(72) Inventors: Yung-Chih Lin, Kaohsiung (TW); Shiao-Wei Kuo, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 15/206,423

(22) Filed: Jul. 11, 2016

(30) Foreign Application Priority Data

Apr. 12, 2016 (TW) .............................. 105111308 A

(51) Int. Cl.
*C08G 77/04* (2006.01)

(52) U.S. Cl.
CPC .................................. *C08G 77/045* (2013.01)

(58) Field of Classification Search
CPC .................................................... C08G 77/045
USPC ............................................................ 544/69
See application file for complete search history.

(56) References Cited

FOREIGN PATENT DOCUMENTS

| CN | 102775614 B | | 7/2014 |
|---|---|---|---|
| JP | 2007/137800 | * | 5/2012 |

OTHER PUBLICATIONS

Taiwanese Office Action dated Nov. 22, 2016 for Taiwanese Patent Application No. 105111308, 3 pages.

* cited by examiner

*Primary Examiner* — Kahsay Habte
(74) *Attorney, Agent, or Firm* — Jackson IPG PLLC; Demian K. Jackson

(57) ABSTRACT

A difunctional polyhedral oligomeric silsesquioxane derivative and synthesis of the present invention is disclosed. The difunctional polyhedral oligomeric silsesquioxane derivative is represented by following formula (I), wherein R is selected from one of

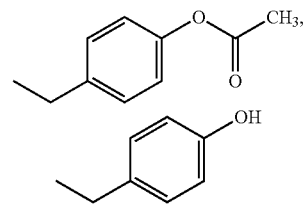

and

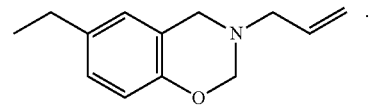

The synthesis of the difunctional polyhedral oligomeric silsesquioxane derivative includes obtaining bis-PA-DDSQ compound though addition reaction of DDSQ compound and 4-acetoxystyrene, obtaining bis-Ph-DDSQ compound though hydrolytic reaction of bis-PA-DDSQ compound and hydrazine, and obtaining bis-AlBz-DDSQ compound though cycloaddition reaction of bis-Ph-DDSQ compound and paraformaldehyde.

(I)

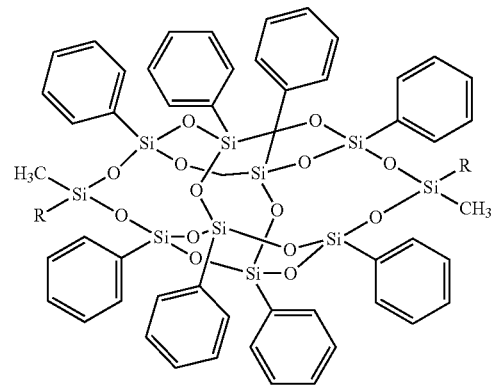

7 Claims, 10 Drawing Sheets

DIFUNCTIONAL POLYHEDRAL OLIGOMERIC SILSESQUIOXANE DERIVATIVE AND SYNTHESIS THEREOF

FIELD OF THE INVENTION

This invention relates to difunctional polyhedral oligomeric silsesquioxane derivative and synthesis thereof. More particularly, the present invention relates to difunctional polyhedral oligomeric silsesquioxane derivative having excellent thermal stability and synthesis thereof.

BACKGROUND OF THE INVENTION

Conventional thermosetting polymer (e.g. phenolic resin or epoxy resin) is usually used as electronic material for thermal isolation, insulation, anti-friction or high pressure resistance because of excellent mechanical and physical properties. For instance, epoxy resin is applied in Copper Clad Laminate (CCL) generally. However, conventional thermosetting polymer after solidification has some disadvantages such as embrittlement and mechanical strength deficiency.

In order to overcome the polymer disadvantages, those skilled in the art attempt to introduce inorganics having silicon-oxygen bond (Si—O bond) into polymer chain for property addition of inorganics and organics. For instance, polydimethylsiloxane (PDMS) is introduced into polybenzoxazine (PBz) to form a composite material which enables to improve PBz embrittlement and maintains PDMS flexibility.

Owing to aggregation phenomenon of inorganics in polymer, dispersibility and proportion of inorganics are not easy to be enhanced by physical dispersion such as sol-gel method, intercalation or delamination, and property addition of the composite material is limited. Oppositely, introducing inorganics into polymer chain directly by chemical bonding is able to relatively increase dispersibility and proportion of inorganics. For instance, introducing polyhedral oligomeric silsesquioxanes (POSS) into organic matrix is able to achieve molecular-level dispersion by polymerization between functional group of POSS and polymer chain.

POSS includes nonfunctional POSS, monofunctional POSS, difunctional POSS and polyfunctional POSS, and POSS structure is mainly composed of silicon-oxygen bond (Si—O bond), wherein silicon-oxygen bond with high bonding energy leads POSS possess excellent thermal stability. Difunctional POSS is able to be introduced into polymer chain backbone directly by cross-condensation to effectively decrease aggregation possibility of POSS and increase POSS proportion. POSS advantages are able to be introduced into organic matrix completely to improve polymer disadvantages. Therefore, those skilled in the art strongly develop difunctional polyhedral oligomeric silsesquioxane derivatives having high stability and synthesis thereof.

SUMMARY

The primary object of the present invention is to provide a difunctional polyhedral oligomeric silsesquioxane derivative represented by following formula (I):

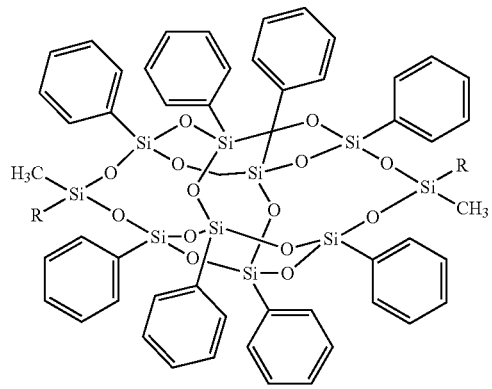

(I)

wherein R is selected from one of

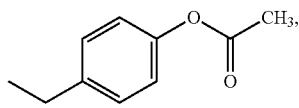

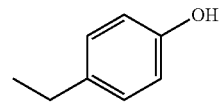

and

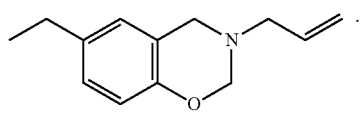

Another object of the present invention is to provide a synthesis of difunctional polyhedral oligomeric silsesquioxane derivative including: DDSQ compound represented by following formula (a), 4-acetoxystyrene and a first solvent are mixed to form a first mixture, and the first mixture is catalyzed by a catalyst to obtain bis-PA-DDSQ compound represented by following formula (b) though addition reaction, wherein the reaction mole ratio of DDSQ compound to 4-acetoxystyrene is 1:2-10.

(a)

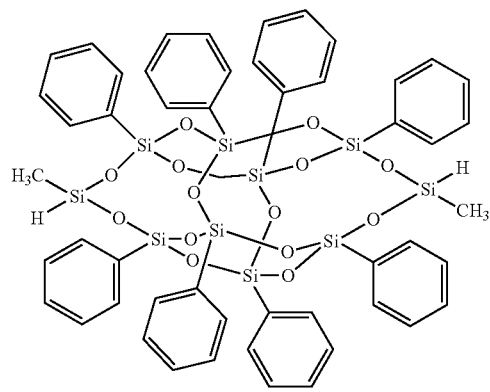

(b)

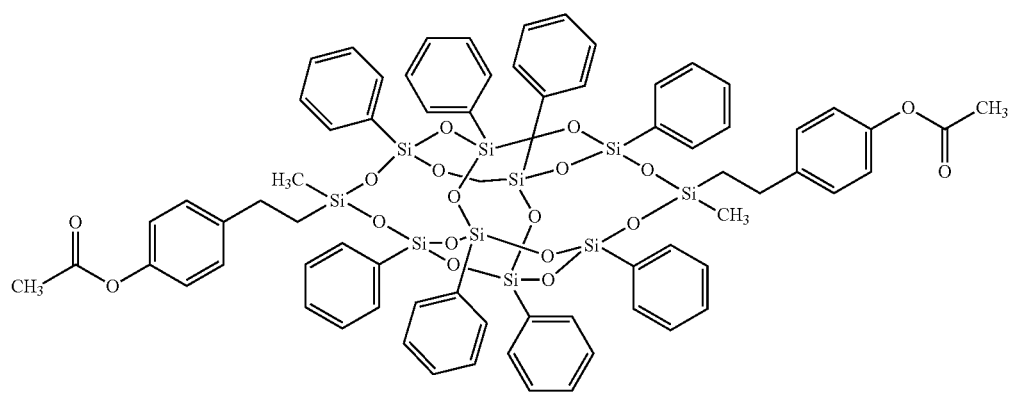

Another object of the present invention is to provide a synthesis of a difunctional polyhedral oligomeric silsesquioxane derivative including: bis-PA-DDSQ compound represented by following formula (b), hydrazine and a second solvent are mixed to form a second mixture, and bis-Ph-DDSQ compound represented by following formula (c) is obtained though hydrolytic reaction of the second mixture, wherein the reaction mole ratio of bis-PA-DDSQ compound to hydrazine is 1:2-20.

Another object of the present invention is to provide a synthesis of a difunctional polyhedral oligomeric silsesquioxane derivative including: bis-Ph-DDSQ compound represented by following formula (c), paraformaldehyde, allylamine and a third solvent are mixed to form a third mixture, and bis-AlBz-DDSQ compound represented by following formula (d) is obtained though cycloaddition reaction of the third mixture, wherein the reaction mole ratio of bis-Ph-DDSQ compound to paraformaldehyde and allylamine is 1:2-8:2-12.

(c)

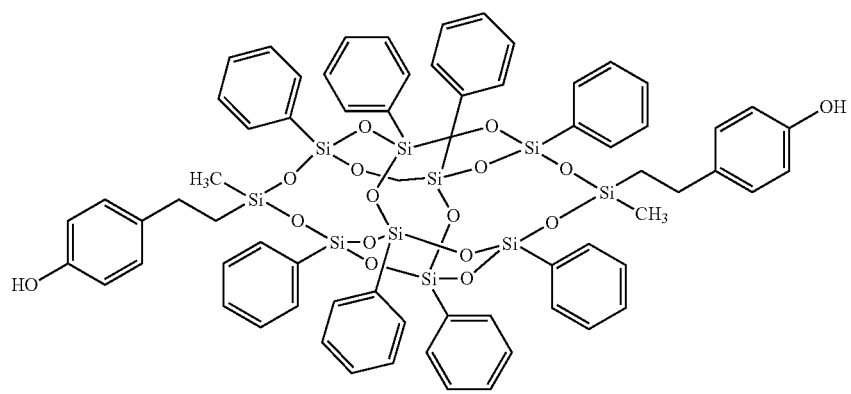

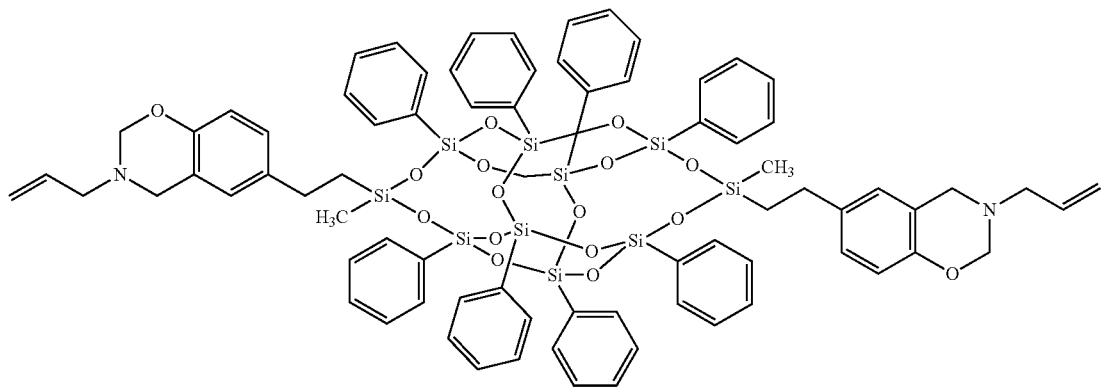

(d)

bis-PA-DDSQ compound, bis-Ph-DDSQ compound and bis-AlBz-DDSQ compound of the present invention have more excellent thermal stability than nonmodified DDSQ compound, so those difunctional polyhedral oligomeric silsesquioxane derivatives of the present invention are not easy to soften or crack in high temperature environment. In addition, poly(bis-AlBz-DDSQ) polymerized by using bis-AlBz-DDSQ compound as monomer has more excellent mechanical and surface hydrophobic properties than polybenzoxazine (PBz) which without DDSQ introduction, so the difunctional polyhedral oligomeric silsesquioxane derivatives of the present invention can be extensively applied to electronics or other related industry.

DETAILED DESCRIPTION OF THE INVENTION

Figure 1:
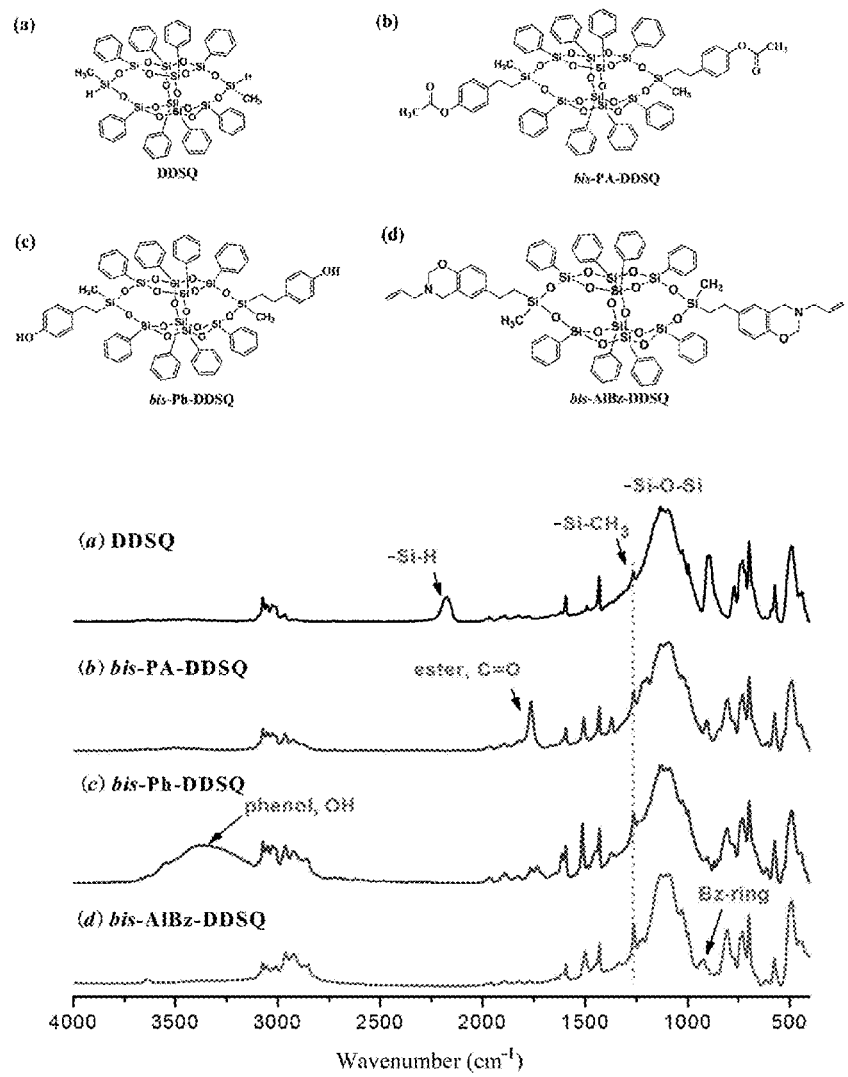
FIG. 1 is a Fourier transform infrared spectrum (FTIR) of difunctional polyhedral oligomeric silsesquioxane derivative of the present invention.

A difunctional polyhedral oligomeric silsesquioxane derivative having excellent thermal stability disclosed in this invention is represented by following formula (I):

(I)

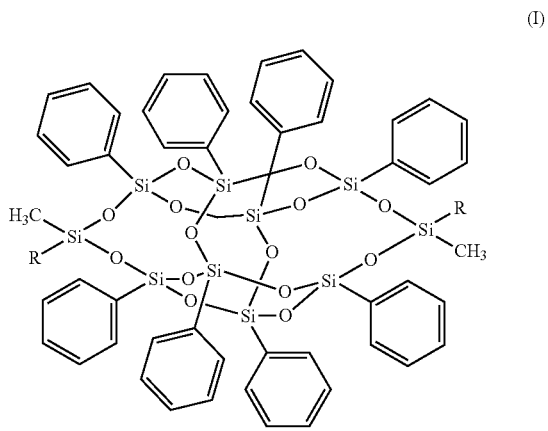

wherein R is selected from one of

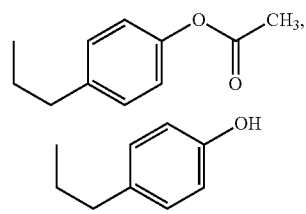

and

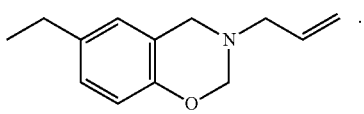

Syntheses of the difunctional polyhedral oligomeric silsesquioxane derivatives in accordance with the present invention are illustrated as below.

Double-Deckered Silsesquioxanes-Na (DD-Na) Compound Synthesis:

Phenyltrimethylsilane, NaOH and 2-propanol are mixed thoroughly and heated under reflux, and then the mixture is stirred at room temperature to obtain DD-Na compound through hydrolysis-condensation reaction of phenyltrimethylsilane. In this embodiment, 14 g of NaOH and 300-500 ml of 2-propanol were placed in three-neck flask with reflux condenser firstly, then 10-20 ml of de-ionized water and 105 g of phenyltrimethylsilane were added, mixed thoroughly and heated under reflux for 4-24 hours. Oil bath was removed after reflux, and stirred continuously for 8-72 hours at room temperature until complete reaction. Preferably, oil bath was removed after reflux for 12 hours, and then stirred continuously for 48 hours at room temperature. The solvent was removed by vacuum distillation after complete reaction, and dried in vacuum oven to obtain white powdery DD-Na compound.

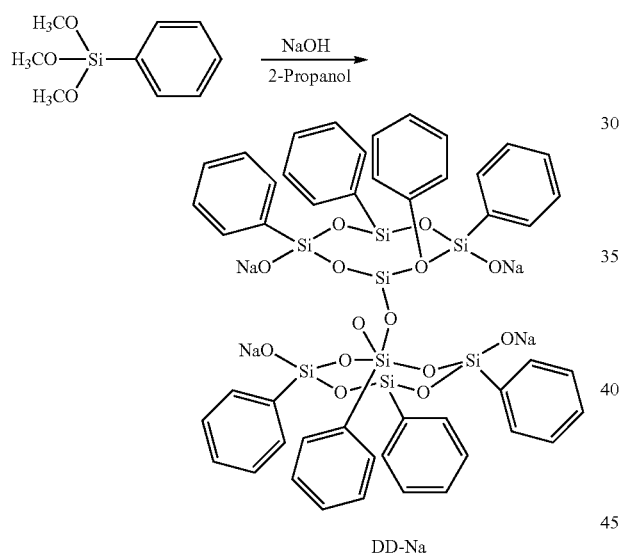

DD-Na

Double-Deckered Silsesquioxanes (DDSQ) Compound Synthesis:

DD-Na compound, methyl dichlorosilane and a fourth solvent are mixed to form a fourth mixture, DDSQ compound possessing complete cage structure is obtained though end-capping reaction of methyl dichlorosilane for 4-10 hours at room temperature, wherein the reaction mole ratio of DD-Na compound to methyl dichlorosilane is 1:2-8, and the fourth solvent was selected from tetrahydrofuran (THF) or toluene. In this embodiment, 11.6 g (10 mmol) of DD-Na compound was placed into three-neck flask with reflux condenser firstly, and 4 g (40 mmol) of triethylamine and 50-200 ml of the fourth solvent were added under $N_2$, wherein the fourth solvent is 50 ml of tetrahydrofuran THF preferably. The three-neck flask was cooled in an ice bath and the mixture was stirred thoroughly, then 4.5 g (40 mmol) of methyl dichlorosilane used as end-capping reactant was added into the flask to react for 6 hours at room temperature. The fourth mixture was filtered to obtain filtrate after completing reaction, and the filtrate was extracted with de-ionized water and supersaturated sodium hydrogen solution ($NaHCO_3$). Organic phase was obtained after separation and dried with magnesium sulfate anhydrous ($MgSO_4$). Solid obtained by vacuum distillation of filtrate was washed several times with methanol and acetonitrile, and dried in vacuum oven to obtain white powdery DDSQ compound. In this embodiment, DDSQ compound possessing difunctional group is prepared by end-capping reaction which is different from conventional hydrolysis-condensation reaction, therefore DDSQ compound synthesis of the present invention can overcome conventional defects such as time-consuming and low yield.

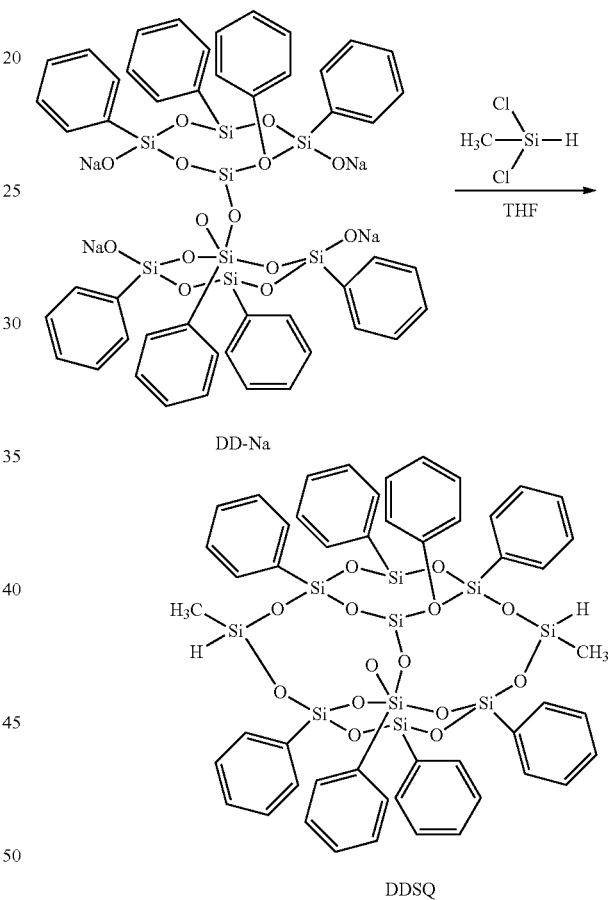

Bis-Phenyl Acetate Double-Deckered Silsesquioxanes (Bis-PA-DDSQ) Compound Synthesis:

DDSQ compound, 4-acetoxystyrene (4-AS) and a first solvent are mixed to form a first mixture; and the first mixture is catalyzed by a catalyst to obtain bis-PA-DDSQ compound though addition reaction. bis-PA-DDSQ compound is synthesized through addition reaction of C=C bond of 4-acetoxystyrene (4-AS) and Si—H bond at two ends of DDSQ compound, wherein the reaction mole ratio of DDSQ compound to 4-acetoxystyrene (4-AS) is 1:2-10, and the first solvent is toluene. In this embodiment, 10 g (8.68 mmol) of DDSQ compound and 8.6 g (52.08 mmol) of 4-acetoxystyrene (4-AS) were placed in three-neck flask with reflux condenser, then 100 ml of toluene used as the first solvent was added into three-neck flask. The first mixture was stirred thoroughly until transparent. The catalyst was added into the first mixture after heated under reflux under $N_2$, preferably, 0.03-0.05 wt % of platinum (Pt) used as the catalyst was added after reflux. Oil bath was removed after complete reaction. The first mixture was filtered to obtain filtrate, wherein leftovers and the first solvent in the filtrate were removed though vacuum distillation to obtain solid. Solid was dried in vacuum oven to obtain milky powdery bis-PA-DDSQ compound. In this embodiment, Si—H bond signal of DDSQ compound monitored by Fourier transform infrared spectrometer (FTIR) during reaction was used as basis to determine whether addition reaction was completed or not. Addition reaction was determined as completed when signal intensity of Si—H bond was decreased to disappear completely.

though hydrolytic reaction of the second mixture, wherein the reaction mole ratio of bis-PA-DDSQ compound to hydrazine monohydrate is 1:2-20, and the second solvent is selected from 1,4-dioxane or tetrahydrofuran (THF). In this embodiment, 10 g (6.78 mmol) of bis-PA-DDSQ compound and 100-300 ml of the second solvent were placed into three-neck flask with reflux condenser and stirred thoroughly until dissolved, preferably, 200 ml of 1,4-dioxane was used as the second solvent. And then 3.39 g (67.8 mmol) of hydrazine monohydrate was added to perform hydrolytic reaction at room temperature. The second mixture was precipitated in de-ionized water and extracted with ethyl acetate to obtain organic phase. Solid was obtained after vacuum distillation of organic phase, and dried in vacuum oven to obtain milky powdery bis-PH-DDSQ compound. In this embodiment, carbonyl group (C═O bond) signal of bis-PA-DDSQ compound monitored by Fourier transform

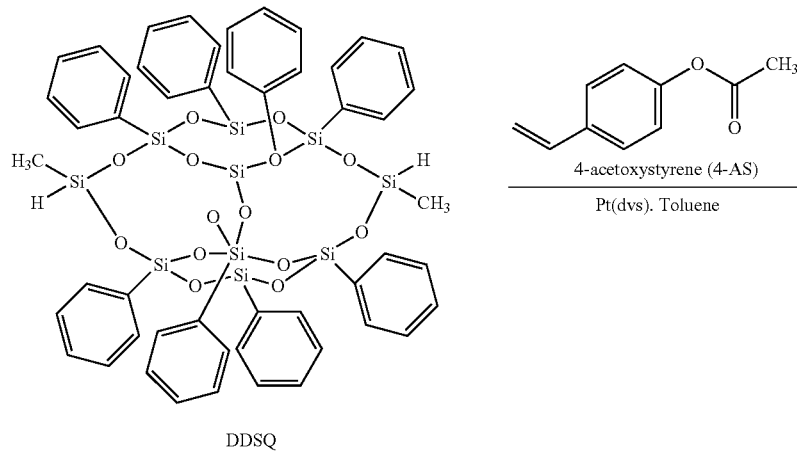

DDSQ

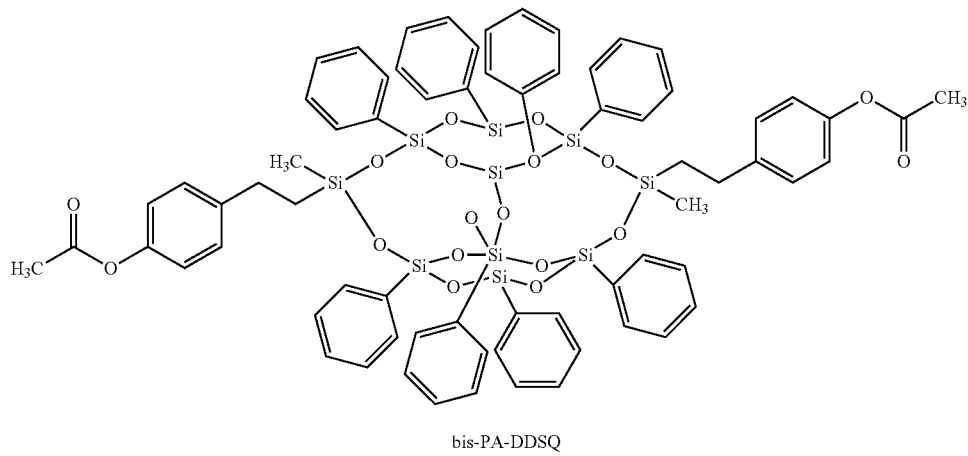

bis-PA-DDSQ

Bis-Phenol Double-Deckered Silsesquioxanes (Bis-PH-DDSQ) Compound Synthesis:

bis-PA-DDSQ compound, hydrazine monohydrate ($NH_2NH_2 \cdot H_2O$) and a second solvent are mixed to form a second mixture, and bis-PH-DDSQ compound is obtained infrared spectrometer (FTIR) during reaction was used as basis to determine whether hydrolytic reaction was completed or not. Hydrolytic reaction was determined as completed when signal intensity of C═O bond was decreased to disappear completely.

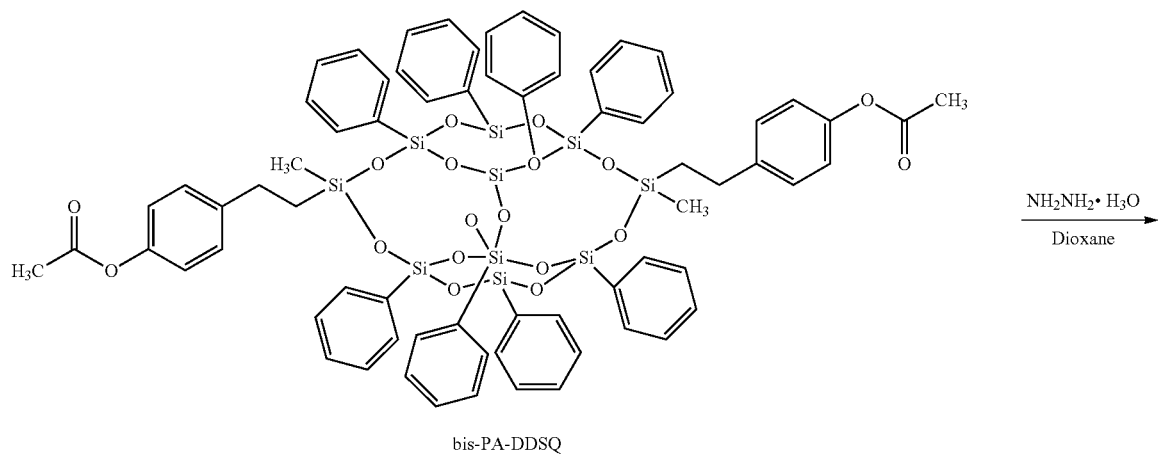

bis-PA-DDSQ

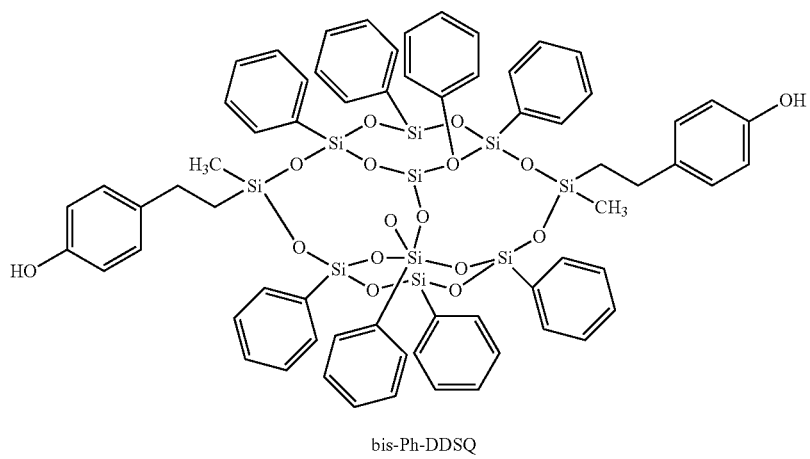

bis-Ph-DDSQ

In this embodiment, bis-Ph-DDSQ compound was synthesized though hydrolytic reaction of bis-PA-DDSQ compound which was synthesized though addition reaction of DDSQ compound. However, the synthesis of bis-PA-DDSQ compound of the present invention is not restricted to addition reaction of DDSQ compound only, and bis-PA-DDSQ compound of the present invention is able to be obtained though other syntheses.

Bis-Allyl Benzoxazine Double-Deckered Silsesquioxanes (Bis-AlBz-DDSQ) Compound Synthesis:

bis-Ph-DDSQ compound, paraformaldehyde ($CH_2O$), allylamine and a third solvent are mixed to form a third mixture, and bis-AlBz-DDSQ compound is obtained though cycloaddition reaction of the third mixture, wherein the reaction mole ratio of bis-Ph-DDSQ compound to paraformaldehyde and allylamine is 1:2-8:2-12, and the third solvent is selected from p-xylene, benzene, toluene, dichloromethane ($CH_2Cl_2$), chloroform or ethyl acetate. In this embodiment, 20 g (14.35 mmol) of bis-Ph-DDSQ compound, 3.48 g (0.115 mol) of paraformaldehyde and 200-300 ml of the third solvent were placed into three-neck flask with reflux condenser. Preferably, the third solvent was 200 ml of p-xylene. 3.28 g (57.40 mmol) of allylamine was added into three-neck flask under $N_2$ after gas replacement (repeat three times). And then the third mixture was heated to 90-110° C. for 8-48 hours, preferably, the third mixture was heated to 100° C. for 24 hours. Oil bath was removed after complete reaction, and impurity was removed by gravity filtration. The third solvent was removed by rotary evaporation, and then dried in vacuum oven to obtain light yellow powdery bis-AlBz-DDSQ compound.

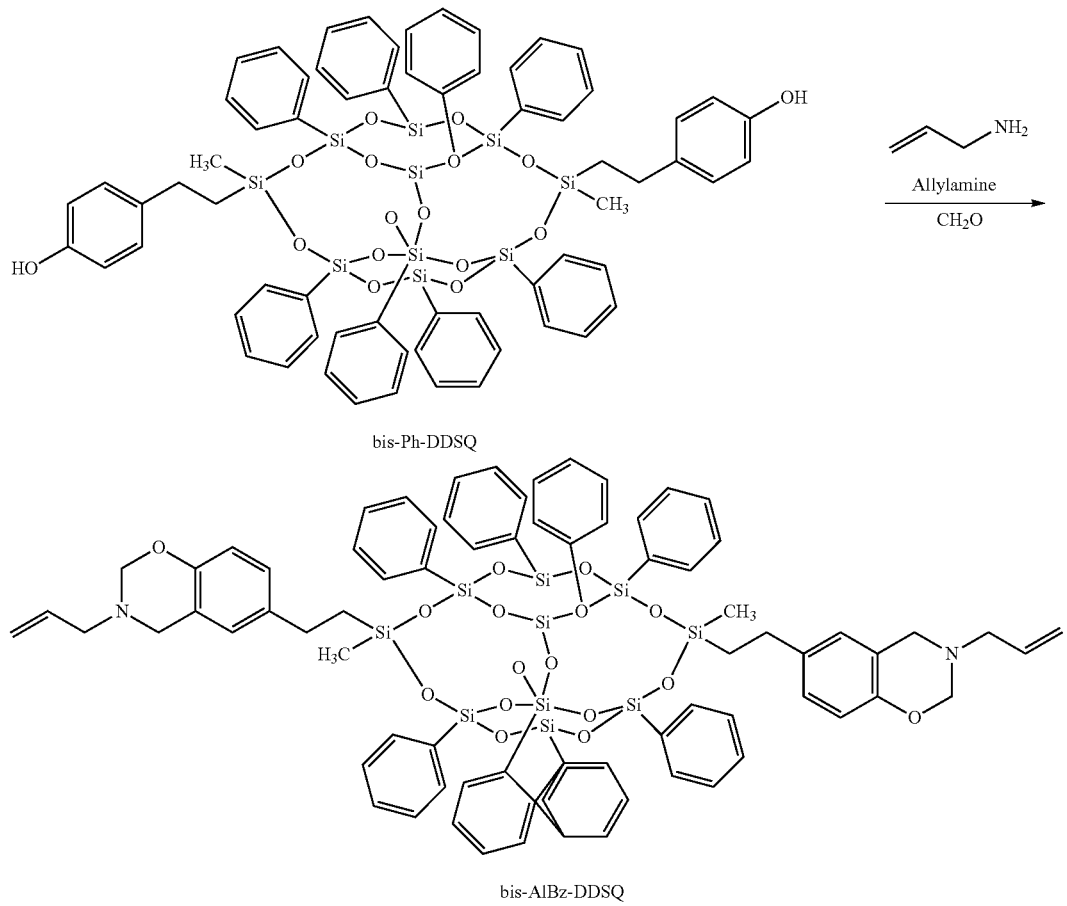

bis-Ph-DDSQ bis-AlBz-DDSQ bis-AlBz-DDSQ compound possesses two benzoxazine (Bz) at two ends, wherein Bz basic structure is a benzene ring attached to a heterocyclic ring with oxygen and nitrogen. The heterocyclic ring with oxygen and nitrogen of Bz will open to proceed polymerization immediately during heat treatment. Therefore, catalytic reaction for polymerization of bis-AlBz-DDSQ compound used as monomer is not necessary.

In this embodiment, bis-AlBz-DDSQ compound was synthesized though cycloaddition reaction of bis-Ph-DDSQ compound which was synthesized though hydrolytic reaction of bis-PA-DDSQ compound. However, the synthesis of bis-Ph-DDSQ compound of the present invention is not restricted to hydrolytic reaction of bis-PA-DDSQ compound only, and bis-Ph-DDSQ compound of the present invention is able to be obtained though other syntheses.

In this study, Fourier transform infrared spectroscopy (FTIR), nuclear magnetic resonance spectroscopy (NMR) and matrix-assisted laser desorption/ionization time of flight mass spectrometer (MALDI-TOF MS) were used to confirm molecular structures of DDSQ compound, bis-PA-DDSQ compound, bis-Ph-DDSQ compound and bis-AlBz-DDSQ compound respectively, and thermogravimetric analysis was used to confirm thermal stabilities of those compounds respectively. The detailed analysis results are illustrated as followed.

Fourier Transform Infrared Spectroscopy (FTIR):

In this study, powder grinded from analysis sample and KBr (the weight ration was 1:200) is pressed by hydraulic press to form KBr disk, and FTIR is used to record characteristic peak of analysis sample.

With reference to FIG. 1, it is FTIR spectra of DDSQ compound (a), bis-PA-DDSQ compound (b), bis-Ph-DDSQ compound (c) and bis-AlBz-DDSQ compound (d). The spectrum of DDSQ compound (a) features a broad signal at 950-1200 $cm^{-1}$ of Si—O—Si bond and signals at 1263 $cm^{-1}$ and 2174 $cm^{-1}$ corresponding to Si—$CH_3$ bond and Si—H bond at two ends respectively.

With reference to FIG. 1, signal at 2174 $cm^{-1}$ of Si—H bond disappears totally and signal at 1762 $cm^{-1}$ of C=O bond appears in spectrum of bis-PA-DDSQ compound (b), which represents that bis-PA-DDSQ (b) compound is actually synthesized through addition reaction of C=C bond of 4-acetoxystyrene (4-AS) and Si—H bond at two ends of DDSQ compound (a). Signal at 1762 $cm^{-1}$ of C=O bond disappears totally and broad signal at 3300-3600 $cm^{-1}$ of O—H bond appears in spectrum of bis-Ph-DDSQ compound (c), which represents that hydrolysis of ester group in 4-acetoxystyrene (4-AS) is actually carried out. Broad signal at 3300-3600 $cm^{-1}$ of O—H bond disappears totally in spectrum of bis-AlBz-DDSQ compound (d), which represents that cycloaddition of benzene ring at two ends of bis-Ph-DDSQ compound (c) is actually carried out to form benzoxazine (Bz) functional group. And signal at 1499 $cm^{-1}$ of C—C bond (in-plane stretching) of Bz benzene ring and signal at 923 $cm^{-1}$ of C—H bond (out-of plane deformation) of Bz heterocyclic ring appear in spectrum of bis-AlBz-DDSQ compound (d), wherein the signals at 1499 $cm^{-1}$ and 923 cm$^{-1}$ are from tri-substituted benzene of bis-AlBz-DDSQ compound (d). In addition, FTIR spectra of bis-PA-DDSQ compound (b), bis-Ph-DDSQ compound (c) and bis-AlBz-DDSQ compound (d) all contain signal at 1263 cm$^{-1}$ of Si—CH$_3$ bond, which represents the cage structure of DDSQ compound (a) is not destroyed during synthesis.

Nuclear Magnetic Resonance ($^1$H-NMR):

In this study, analysis sample is dissolved in CDCl$_3$, and tetramethylsilane (TMS; δ=0 ppm) is used as internal standard for $^1$H-NMR, wherein unit of chemical shift is ppm.

Figure 2:
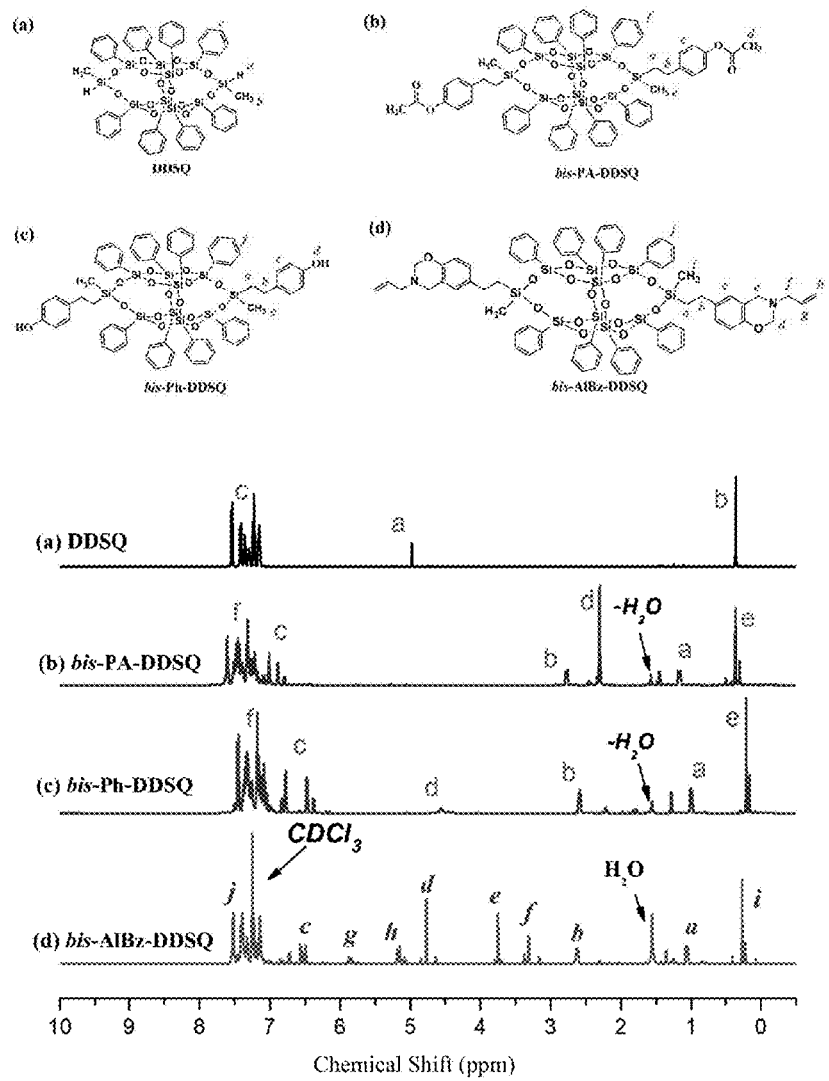
FIG. 2 is a nuclear magnetic resonance spectrum ($^1$H-NMR) of the difunctional polyhedral oligomeric silsesquioxane derivative of the present invention.

With reference to FIG. 2, it is $^1$H-NMR spectra of DDSQ compound (a), bis-PA-DDSQ compound (b), bis-Ph-DDSQ compound (c) and bis-AlBz-DDSQ compound (d). The spectrum of DDSQ compound (a) features signals at 4.98 ppm (signal a), 0.36 ppm (signal b) and 7.14-7.55 ppm (signal c) corresponding to Si—H, Si—CH$_3$ and Si-Ph respectively.

With reference to FIG. 2, signal at 4.98 ppm (signal a) of Si—H disappears totally and signal at 2.29 ppm (signal d) of O═C—CH$_3$ appears in spectrum of bis-PA-DDSQ compound (b), which represents that bis-PA-DDSQ compound (b) is synthesized successfully. Signal at 2.29 ppm (signal d) of O═C—CH$_3$ disappears totally and signal at 4.55 ppm (signal d) of Ph-OH appears in spectrum of bis-Ph-DDSQ compound (c), which represent that bis-Ph-DDSQ compound (c) is synthesized successfully. The spectrum of bis-AlBz-DDSQ compound (d) features signal g and signal h of terminal double bond which are split peak signals generated by different environments, and features signals at 4.77 ppm (signal d) and 3.75 ppm (signal e) of oxazine ring, which represents that bis-AlBz-DDSQ compound (d) is synthesized successfully.

In addition, $^1$H-NMR spectra of bis-PA-DDSQ compound (b), bis-Ph-DDSQ compound (c) and bis-AlBz-DDSQ compound (d) all contain Si—CH$_3$ signal, which represents the cage structure of DDSQ compound (a) is not destroyed during synthesis.

Matrix-Assisted Laser Desorption/Ionization Time of Flight Mass Spectroscrpy (MALDI-TOF MS):

In this study, dithranol, tetrahydrofuran (THF) and sodium trifluoroacetate are used as matrix, solvent and sodium source respectively. And mass spectrometer is used for measuring absolute molecular weight of samples.

Figure 3:
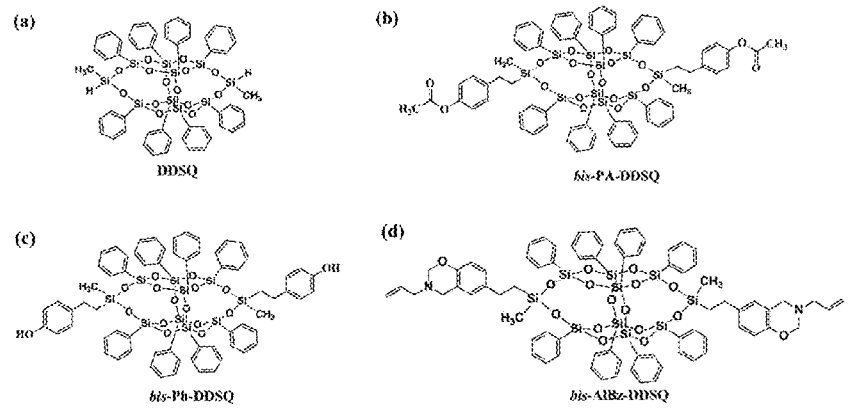
FIG. 3 is a matrix-assisted laser desorption/ionization time of flight mass spectrometer spectrum (MALDI-TOFMS) of the difunctional polyhedral oligomeric silsesquioxane derivative of the present invention.
Figure 3:
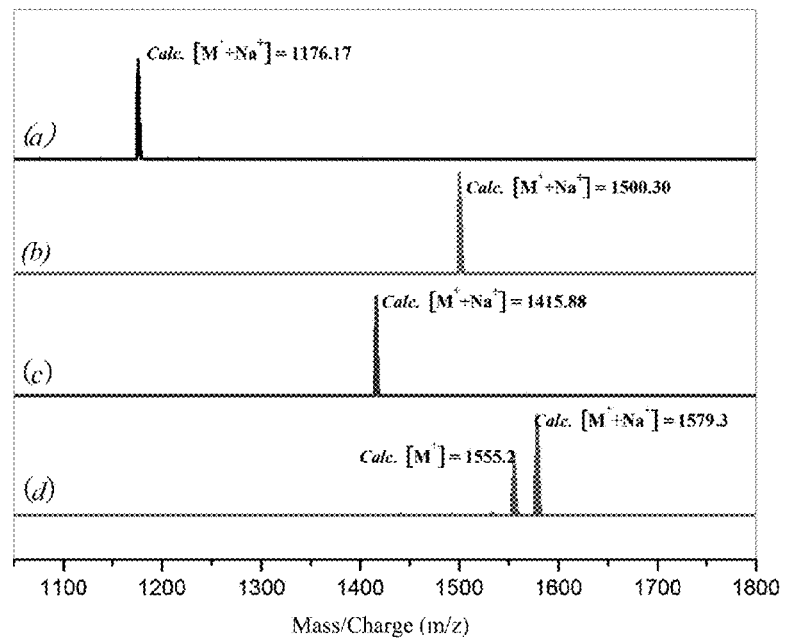

With reference to FIG. 3, it is mass spectra of DDSQ compound (a), bis-PA-DDSQ compound (b), bis-Ph-DDSQ compound (c) and bis-AlBz-DDSQ compound (d). The spectrum of DDSQ compound (a) shows single peak at m/z 1176.17, wherein the calculated m/z value of DDSQ compound (a) is m/z 1152, and m/z 1176 is the m/z value of DDSQ compound (a) with a sodium ion, so it represents that DDSQ compound (a) is synthesized successfully.

With reference to FIG. 3, the spectrum of bis-PA-DDSQ compound (b) shows single peak at m/z 1500.30, and the peak of DDSQ compound (a) disappears totally, wherein the calculated m/z value of bis-PA-DDSQ (b) compound is m/z 1477, and m/z 1500 is the m/z value of bis-PA-DDSQ (b) compound with a sodium ion, so it represents that bis-PA-DDSQ compound (b) is synthesized successfully. The spectrum of bis-Ph-DDSQ compound (c) shows single peak at m/z 1415.88, and the peak of bis-PA-DDSQ compound (b) disappears totally, wherein the calculated m/z value of bis-Ph-DDSQ (c) compound is m/z 1393, and m/z 1416 is the m/z value of bis-Ph-DDSQ (c) compound with a sodium ion, so it represents that bis-Ph-DDSQ compound (c) is synthesized successfully. The spectrum of bis-AlBz-DDSQ compound (d) shows peaks at m/z 1555.2 and m/z 1579.3 respectively, and the peak of bis-Ph-DDSQ compound (c) disappears totally, wherein the calculated m/z value of bis-AlBz-DDSQ compound (d) is m/z 1554.2, and m/z 1555.2 is within the theoretical tolerance range, and m/z 1579.3 is the m/z value of bis-AlBz-DDSQ compound (d) with a sodium ion, so it represents that bis-AlBz-DDSQ compound (d) is synthesized by complete cycloaddition of bis-Ph-DDSQ compound (c) and allylamine.

In addition there is no noise in the spectrum of DDSQ compound (a), bis-PA-DDSQ compound (b), bis-Ph-DDSQ compound (c) and bis-AlBz-DDSQ compound (d), which represents that those compounds synthesized through the synthesis of the present invention are high-purity.

Figure 4:
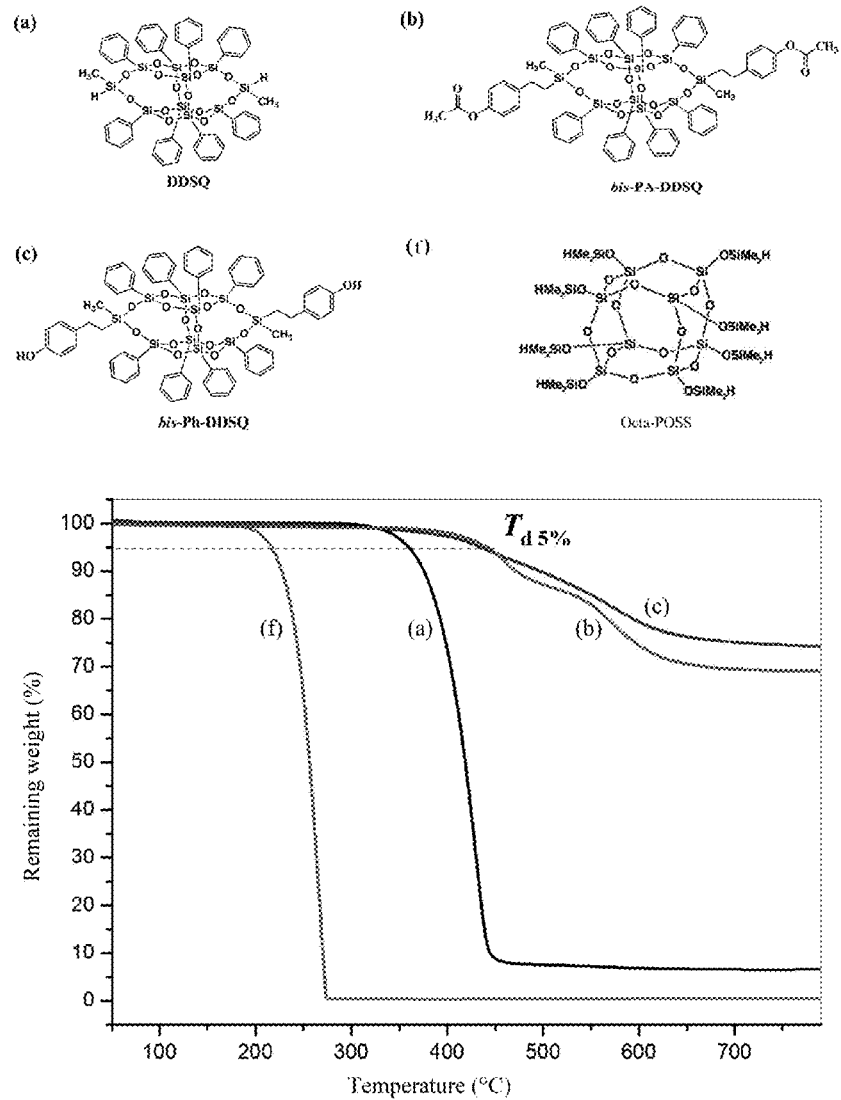
FIG. 4 is a thermogravimetric analysis (TGA) result of the difunctional polyhedral oligomeric silsesquioxane derivative of the present invention.

Thermogravimetric Analysis (TGA):

Referring to FIG. 4, Octa-POSS compound (f) is conventional nonfunctional POSS used as control compound to compare with DDSQ compound (a), bis-PA-DDSQ compound (b) and bis-Ph-DDSQ compound (c) on thermal stability. In this study, 2-5 mg of each sample compound is placed on Pt cell respectively and heated at a rate of 20° C. min$^{-1}$ from room temperature to 800° C. to record weight variation.

Referring to FIG. 4, the remaining weight of Octa-POSS compound (f) is close to 0% before heated to 300° C., that is to say, the weight loss of Octa-POSS compound (f) is close to 100% before heated to 300° C. And the remaining weights of DDSQ compound (a), bis-PA-DDSQ compound (b) and bis-Ph-DDSQ compound (c) are close to 100% before heated to 300° C., wherein the primary reason is that the external benzene ring of DDSQ compound (a), bis-PA-DDSQ compound (b), bis-Ph-DDSQ compound (c) is harder for high temperature tolerance, but Octa-POSS compound (f) is cracked and evaporated as gas at elevated temperature because the external group of Octa-POSS compound (f) is short carbon chain. Obviously, DDSQ compound (a), bis-PA-DDSQ compound (b) and bis-Ph-DDSQ compound (c) all possess excellent thermal stability in monomer.

In addition, the remaining weights of bis-PA-DDSQ compound (b) and bis-Ph-DDSQ compound (c), 69% and 72% respectively, are obviously higher than that of DDSQ compound (a) which is lower than 10% when heated to 800° C. It is clear to know that bis-PA-DDSQ compound (b) and bis-Ph-DDSQ compound (c) which are modified difunctional polyhedral oligomeric silsesquioxane derivatives possess higher thermal stability than DDSQ compound (a) which is unmodified difunctional polyhedral oligomeric silsesquioxane derivative.

Referring to FIG. 4, $T_{d5\%}$ is thermal decomposition temperature corresponding to 5% weight loss. $T_{d5\%}$ of Octa-POSS compound (f) is 216.5° C., $T_{d5\%}$ of DDSQ compound (a) is 359.8° C., $T_{d5\%}$ of bis-PA-DDSQ (b) compound is 434.5° C., and $T_{d5\%}$ of bis-Ph-DDSQ compound (c) is 441.9° C., wherein $T_{d5\%}$ of bis-PA-DDSQ compound (b) and bis-Ph-DDSQ compound (c) are higher than that of Octa-POSS compound (f) and DDSQ compound (a). It is clear to know that the thermal stability of bis-PA-DDSQ compound (b) and bis-Ph-DDSQ compound (c) which are modificated difunctional polyhedral oligomeric silsesquioxane derivatives is actually enhanced.

Figure 5A:
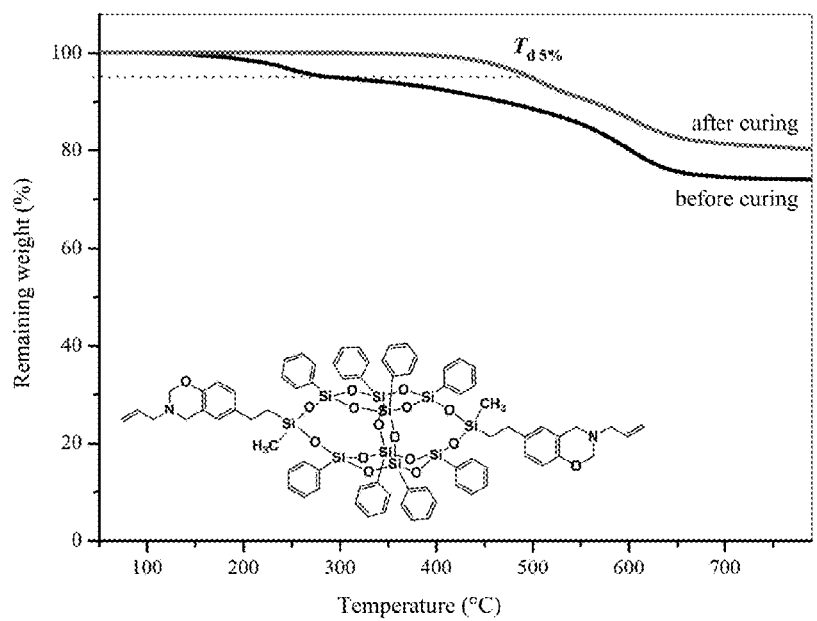
FIG. 5a is a thermogravimetric analysis (TGA) result of the difunctional polyhedral oligomeric silsesquioxane derivative of the present invention.

Referring to FIG. 5a, it is thermogravimetric analysis result of bis-AlBz-DDSQ compound (d) before and after curing, wherein $T_{d5\%}$ is 273.4° C. and 500.1° C. respectively, and the remaining weight at 800° C. is 74% and 80% respectively. Thermal stability of bis-AlBz-DDSQ compound (d) after curing is enhanced because of reticular poly(bis-AlBz-DDSQ) formation.

Referring to FIGS. 4 and 5a, comparing the results of Octa-POSS compound (f), DDSQ compound (a) and bis- AlBz-DDSQ compound (d) is clear to know that $T_{d5\%}$ and the remaining weight of bis-AlBz-DDSQ compound (d) before curing are both higher than that of Octa-POSS compound (f), and the remaining weight of bis-AlBz-DDSQ compound (d) before curing, which is 74%, is obviously higher than that of DDSQ compound (a), which is lower than 10%. That is to say, the thermal stability of bis-AlBz-DDSQ compound (d) which is modificated difunctional polyhedral oligomeric silsesquioxane derivative is enhanced actually.

Figure 5B:
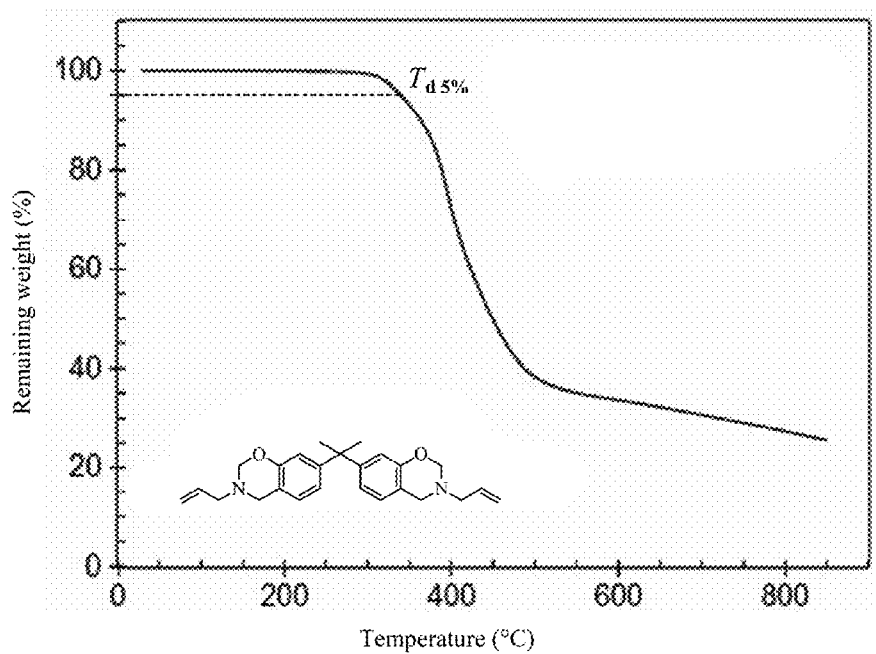
FIG. 5b is a thermogravimetric analysis (TGA) result of a control compound.

Referring to FIG. 5b, it is thermogravimetric analysis result of bis-Ala Benoxazine (AlBz) after curing, wherein AlBz is used as control compound to compare with bis-AlBz-DDSQ after curing compound on thermal stability. $T_{d5\%}$ of control compound AlBz is about 350° C., and the remaining weight of AlBz is 30% when heated to 800° C. Comparing FIGS. 5a and 5b is clear to know that thermal stability of bis-AlBz-DDSQ compound after curing is obviously higher than that of AlBz, so DDSQ introduction actually enables to enhance thermal stability of benzoxazine (Bz) to lead bis-AlBz-DDSQ compound possesses excellent thermal stability.

Fourier Transform Infrared Spectroscopy (FTIR):

FTIR spectra of bis-AlBz-DDSQ compound before and after curing are recorded for confirming structure variation, and temperature-dependent FTIR spectra of bis-AlBz-DDSQ compound is recorded for confirming ring opening at different curing temperatures. In this study, bis-AlBz-DDSQ compound is heated from room temperature, and the spectrum is recorded at each 30° C., wherein the analysis results are illustrated as followed.

Figure 6A:
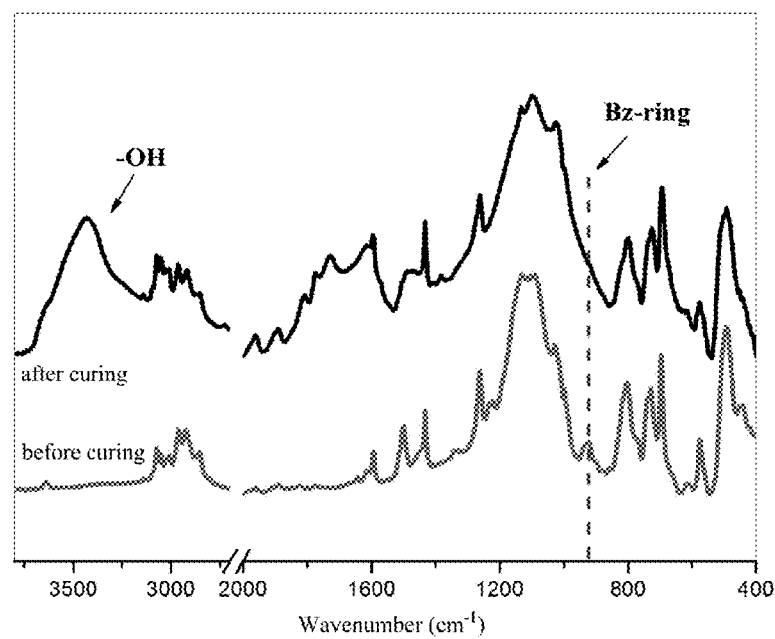
FIG. 6a is a Fourier transform infrared spectrum (FTIR) of difunctional polyhedral oligomeric silsesquioxane derivative of the present invention.

Referring to FIG. 6a, it is FTIR spectrum of bis-AlBz-DDSQ compound before and after curing. The spectrum of bis-AlBz-DDSQ compound before curing features a signal at 923 cm$^{-1}$ of Bz-ring (heterocyclic ring), and the spectrum of bis-AlBz-DDSQ compound after curing features a signal at 3300 cm$^{-1}$ of O—H bond generated after ring opening, wherein the signal of Bz-ring (heterocyclic ring) disappears after curing. This result represents that Bz heterocyclic ring at two ends of bis-AlBz-DDSQ compound is opened completely after curing.

Figure 6B:
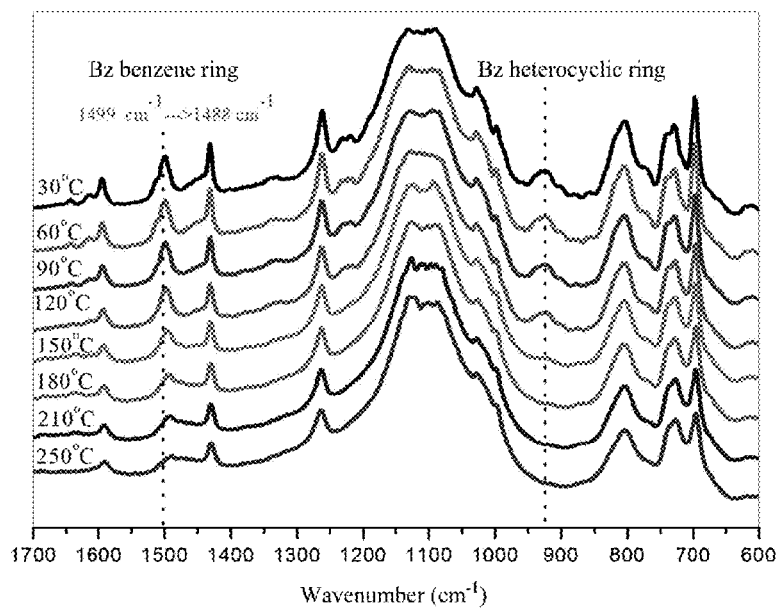
FIG. 6b is a temperature-dependent Fourier transform infrared spectrum (FTIR) of difunctional polyhedral oligomeric silsesquioxane derivative of the present invention.

Referring to FIG. 6b, it is temperature-dependent FTIR spectrum of bis-AlBz-DDSQ compound. A signal at 923 cm$^{-1}$ of Bz heterocyclic ring appears at room temperature (30° C.), and the signal of Bz heterocyclic ring does not change obviously until heated to 120° C. However, the signal intensity of Bz heterocyclic ring decreases evidently when heated to 150° C., suggesting that Bz heterocyclic ring opening of bis-AlBz-DDSQ compound occurs at 150° C. The signal of Bz heterocyclic ring disappears mostly when heated to 250° C., suggesting that Bz heterocyclic ring opening of bis-AlBz-DDSQ compound is completed totally. In addition, ring opening result of evaluated temperature affects the chemical environment of integral structure indirectly to lead the benzene ring signal shift from 1499 cm$^{-1}$ to 1488 cm$^{-1}$ when the temperature increased.

Dynamic Mechanical Analysis:

Dynamic mechanical analyzer (DMA) is used to analysis mechanical property of poly(bis-AlBz-DDSQ) formed by curing bis-AlBz-DDSQ compound. In this study, poly(bis-AlBz-DDSQ) sample is heated from room temperature at a heating rate of 1° C. min$^{-1}$. In general, storage module (E') in DMA analysis is regarded as sample hardness, wherein high storage modulus and low tan δ when sample is placed at low temperature, and low storage modulus and high tan δ when sample is heated to turn soft. The temperature having maximum tan δ is regarded as glass transition temperature ($T_g$) generally.

Figure 7:
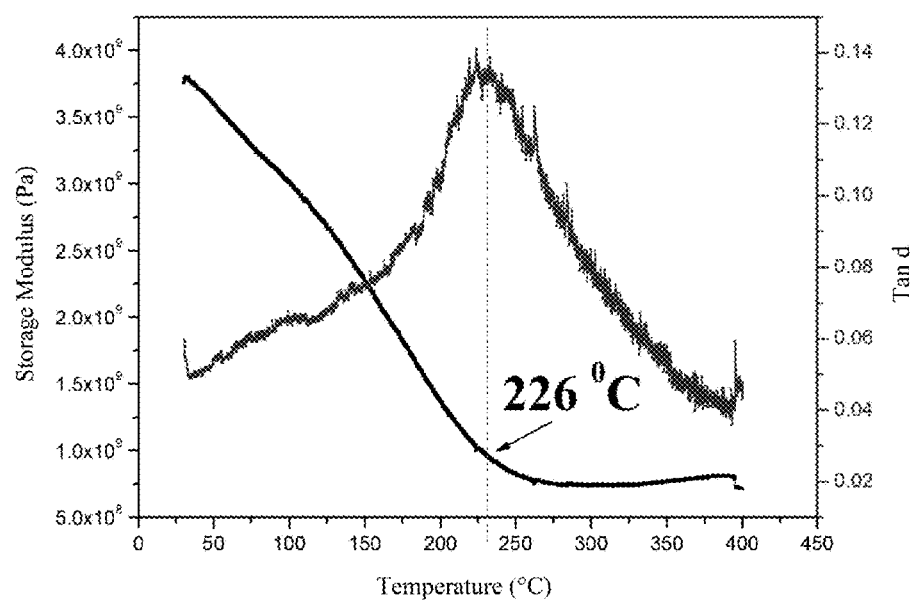
FIG. 7 is a dynamic mechanic analysis (DMA) result of difunctional polyhedral oligomeric silsesquioxane derivative of the present invention.

Referring to FIG. 7, it is DMA analysis of poly(bis-AlBz-DDSQ), wherein storage modulus decreases gradually and tan δ increases gradually when temperature increases, and the maximum tan δ appears at 226° C. which regards as $T_g$ of poly(bis-AlBz-DDSQ), and the maximum tan δ of poly-benzoxazine (PBz) which is control polymer appears at about 180° C. (drawing not shown). Therefore, poly(bis-AlBz-DDSQ) formed by introducing DDSQ into Bz is applicable to higher temperature operation and possesses more excellent thermal stability than the control polymer PBz without DDSQ introduction.

Tensile Test:

Tensile property of poly(bis-AlBz-DDSQ) formed by curing bis-AlBz-DDSQ compound is confirmed by tensile test. In this study, poly(bis-AlBz-DDSQ) is stretched until broken at a tensile rate of 0.5 mm cm$^{-1}$.

Figure 8:
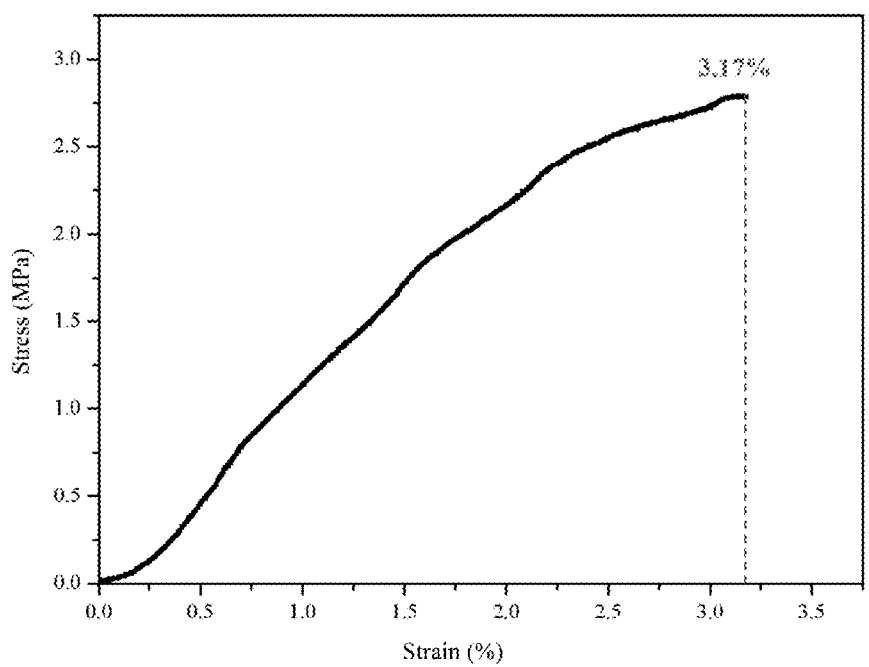
FIG. 8 is a stress-strain curve of difunctional polyhedral oligomeric silsesquioxane derivative of the present invention.

Referring to FIG. 8, it is stress-strain curve of poly(bis-AlBz-DDSQ), wherein the tensile strain percentage of poly(bis-AlBz-DDSQ) at break is 3.17%, and the maximum tensile strain percentage of the control polymer PBz at break is 1.5% (drawing not shown). In contrast with PBz, poly(bis-AlBz-DDSQ) possessed higher tensile strain to resist more deformation, so poly(bis-AlBz-DDSQ) has more excellent mechanical characteristics.

Hydrophobic Property Test:

Contact angle (CA) analyzer is used to measure water contact angle on poly(bis-AlBz-DDSQ) film surface for confirming surface hydrophobic property of poly(bis-AlBz-DDSQ) formed by curing bis-AlBz-DDSQ compound. Poly(bis-AlBz-DDSQ) is coated on a glass substrate by spin coater, placed in vacuum oven for thermal curing, and used to measure contact angle with water by contact angle analyzer. In this study, the contact angle of poly(bis-AlBz-DDSQ) is 126.7°±2.7° and the surface displays hydrophobic character. However, the contact angle of AlBz without DDSQ introduction is about 100°. This result represents that surface hydrophobic property of Bz is really enhanced by introducing DDSQ into Bz.

In addition, intermolecular hydrogen bond O—H . . . N of Bz after curing will be broke under UV irradiation and become intramolecular hydrogen bone to lead Bz surface display hydrophilic character. And then Bz surface will display hydrophobic character again after thermal curing again, which represents that hydrophilic character of Bz is reversible. For confirming hydrophilic character of poly(bis-AlBz-DDSQ) whether is reversible like Bz, the contact angle of poly(bis-AlBz-DDSQ) is measured under UV irradiation at 254 nm for 1 hour, wherein the contact angle is 85.5° in this study. Then poly(bis-AlBz-DDSQ) is placed at 230° C. for 2 hours for thermal curing again, wherein the contact angle is 119.0°, which represents that hydrophobic property of poly(bis-AlBz-DDSQ) and Bz both are reversible.

It is clear to know that bis-PA-DDSQ compound, bis-Ph-DDSQ compound and bis-AlBz-DDSQ compound synthesized by the syntheses of the present invention are high purity according to the results of FTIR, $^1$H-NMR and MS, and bis-PA-DDSQ compound, bis-Ph-DDSQ compound and bis-AlBz-DDSQ compound all possess excellent thermal stability at high temperature according thermogravimetric analysis result. At the same time, it is clear to know that bis-AlBz-DDSQ compound after curing has more excellent tensile strain and surface hydrophobic property in contrast to AlBz after curing without DDSQ introduction. In addition, difunctional polyhedral oligomeric silsesquioxane derivatives of the present invention can be introduced into organics by functional groups at two ends of the derivatives, wherein the functional groups at two ends enable to avoid aggregation effectively and increase the introduction ratio in the organics dramatically for extensive application.

While this invention has been particularly illustrated and described in detail with respect to the preferred embodiments thereof, it will be clearly understood by those skilled in the art that is not limited to the specific features shown and described and various modified and changed in form and details may be made without separation from the spirit and scope of this invention.

What is claimed is:

1. A difunctional polyhedral oligomeric silsesquioxane derivative represented by following formula (I):

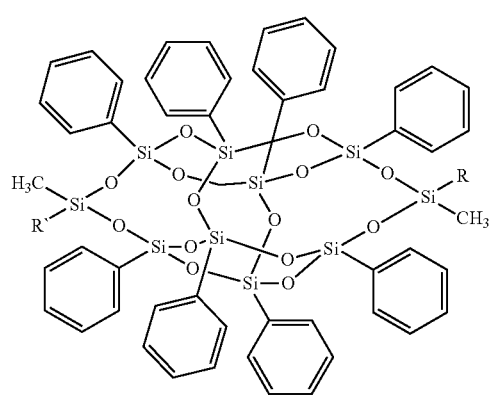

(I)

wherein R is selected from one of

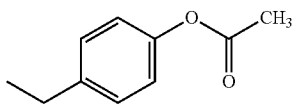

and

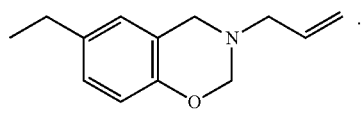

2. A synthesis of difunctional polyhedral oligomeric silsesquioxane derivative includes:

DDSQ compound represented by following formula (a), 4-acetoxystyrene and a first solvent are mixed to form a first mixture, and the first mixture is catalyzed by a catalyst to obtain bis-PA-DDSQ compound represented by following formula (b) though addition reaction, wherein the reaction mole ratio of DDSQ compound to 4-acetoxystyrene is 1:2-10, the first solvent is toluene, and the catalyst is platinum (Pt),

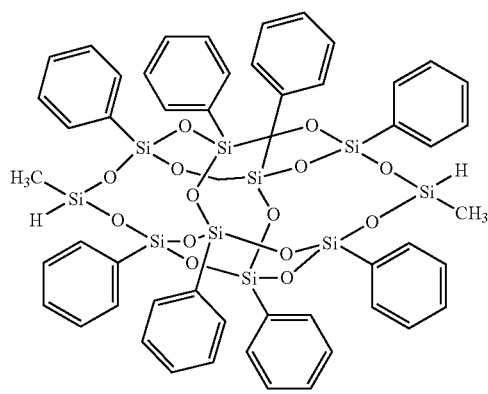

(a)

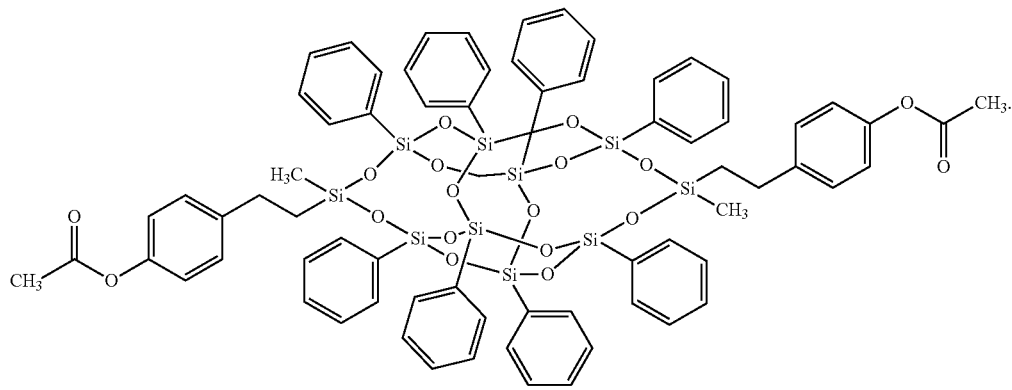

(b)

3. The synthesis of difunctional polyhedral oligomeric silsesquioxane derivative in accordance with claim 2, wherein bis-PA-DDSQ compound, hydrazine and a second solvent are mixed to form a second mixture after obtaining bis-PA-DDSQ compound, and bis-Ph-DDSQ compound represented by following formula (c) is obtained though hydrolytic reaction of the second mixture, wherein the reaction mole ratio of bis-PA-DDSQ compound to hydrazine is 1:2-20, and the second solvent is selected from 1,4-dioxane or tetrahydrofuran (THF), 5. The synthesis of difunctional polyhedral oligomeric silsesquioxane derivative in accordance with claim 2, wherein DD-Na compound represented by following formula (e), methyl dichlorosilane and a fourth solvent are mixed to form a fourth mixture, and DDSQ compound is obtained though end-capping reaction of the fourth mixture, wherein the reaction mole ratio of DD-Na compound to methyl dichlorosilane is 1:2-8, and the fourth solvent is selected from tetrahydrofuran (THF) or toluene,

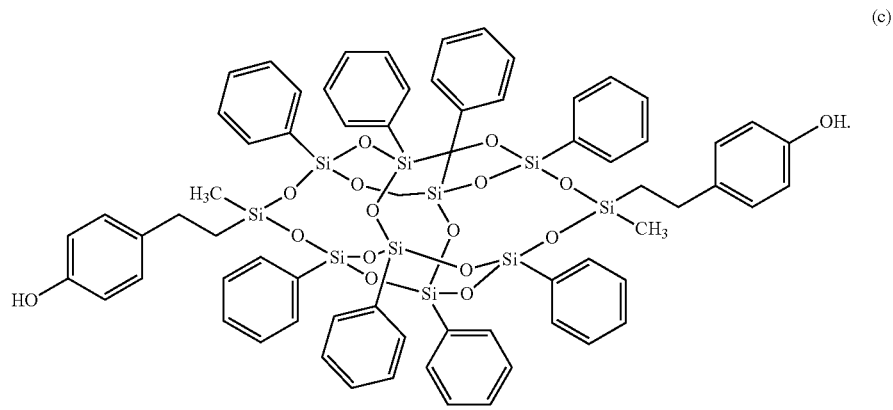 [SMILES: C[Si]1(CCc2ccc(O)cc2)O[Si]2(c3ccccc3)O[Si]3(c4ccccc4)O[Si]4(c5ccccc5)O[Si](C)(CCc5ccc(O)cc5)O[Si]5(c6ccccc6)OC[Si]6(O[Si](c7ccccc7)(OC6(c6ccccc6)[Si](c6ccccc6)(O5)O[Si](c5ccccc5)(O2)O4)O1)O3]

(c)

4. The synthesis of difunctional polyhedral oligomeric silsesquioxane derivative in accordance with claim 3, wherein bis-Ph-DDSQ compound, paraformaldehyde, allylamine and a third solvent are mixed to form a third mixture, and bis-AlBz-DDSQ compound represented by following formula (d) is obtained though cycloaddition reaction of the third mixture, wherein the reaction mole ratio of bis-Ph-DDSQ compound to paraformaldehyde and allylamine is 1:2-8:2-12, and the third solvent is selected from p-xylene, benzene, toluene, dichloromethane, chloroform or ethyl acetate,

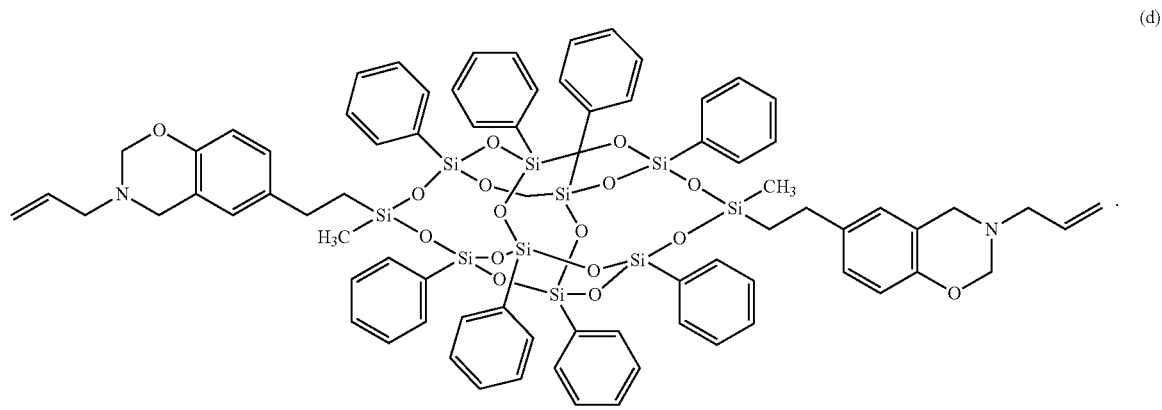 [SMILES: C=CCN1COc2ccc(CC[Si]3(C)O[Si]4(c5ccccc5)O[Si]5(c6ccccc6)O[Si]6(c7ccccc7)O[Si](C)(CCc7ccc8c(c7)CN(CC=C)CO8)O[Si]7(c8ccccc8)OC[Si]8(O[Si](c9ccccc9)(OC8(c8ccccc8)[Si](c8ccccc8)(O7)O[Si](c7ccccc7)(O4)O6)O3)O5)cc2C1]

(d)

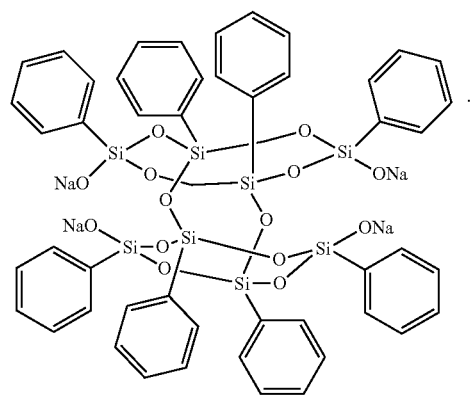

(e)

6. A synthesis of difunctional polyhedral oligomeric silsesquioxane derivative includes:

bis-PA-DDSQ compound represented by following formula (b), hydrazine and a second solvent are mixed to form a second mixture, and bis-Ph-DDSQ compound represented by following formula (c) is obtained though hydrolytic reaction of the second mixture, wherein the reaction mole ratio of bis-PA-DDSQ compound to hydrazine is 1:2-20, and the second solvent is selected from 1,4-dioxane or tetrahydrofuran (THF),

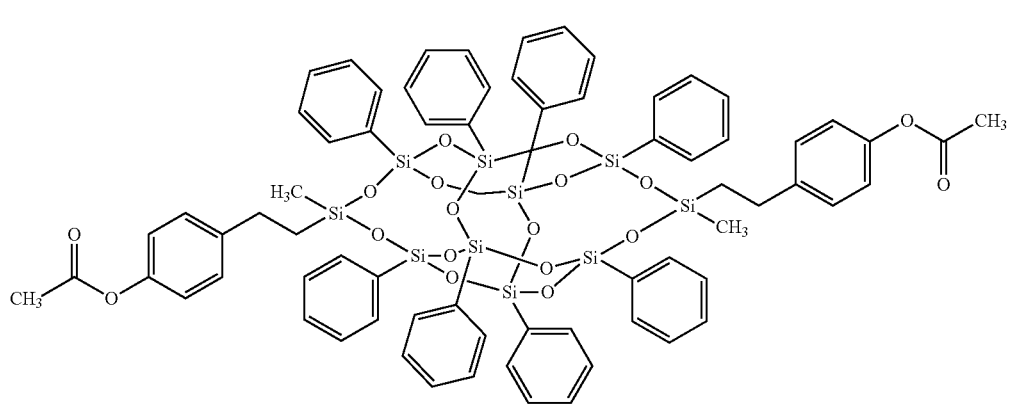

(b)

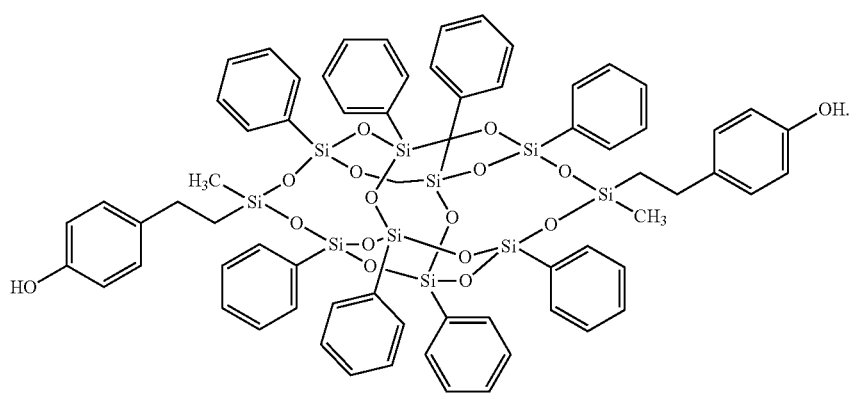

(c)

7. A synthesis of difunctional polyhedral oligomeric silsesquioxane derivative includes:

bis-Ph-DDSQ compound represented by following formula (c), paraformaldehyde, allylamine and a third solvent are mixed to form a third mixture, and bis-AlBz-DDSQ compound represented by following formula (d) is obtained though cycloaddition reaction of the third mixture, wherein the reaction mole ratio of bis-Ph-DDSQ compound to paraformaldehyde and allylamine is 1:2-8:2-12, and the third solvent is selected from p-xylene, benzene, toluene, dichloromethane, chloroform or ethyl acetate,

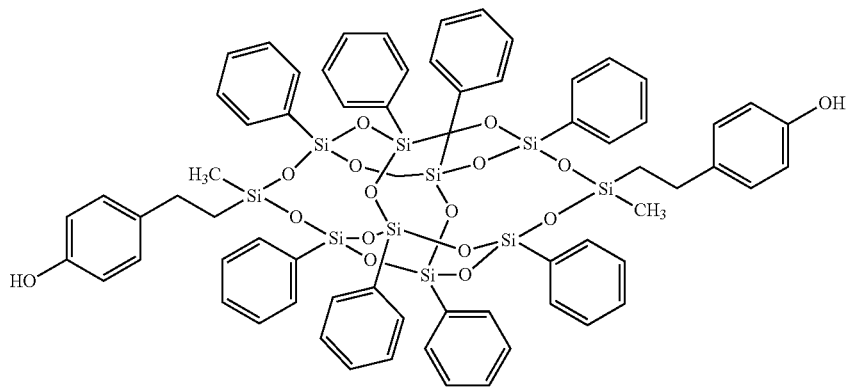

(c)

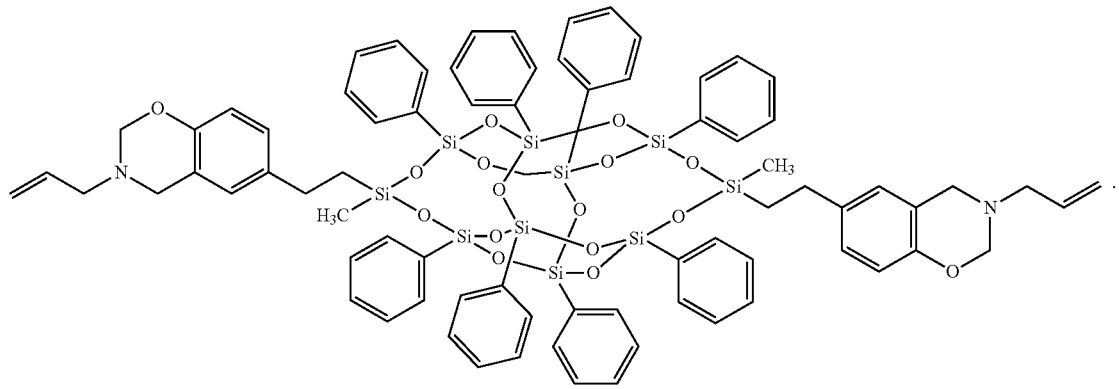

(d)

* * * * *